United States Patent [19]
Drexler et al.

[11] 4,145,758
[45] Mar. 20, 1979

[54] ERROR CHECKING METHOD AND APPARATUS FOR DIGITAL DATA IN OPTICAL RECORDING SYSTEMS

[75] Inventors: Jerome Drexler, Los Altos Hills; Carl R. Betz, Los Altos, both of Calif.

[73] Assignee: Drexler Technology Corporation, Palo Alto, Calif.

[21] Appl. No.: 845,332

[22] Filed: Oct. 25, 1977

[51] Int. Cl.² .................. G11C 29/00; G11C 13/04
[52] U.S. Cl. .......................... 365/200; 179/100.3 V; 358/128; 365/127; 365/215
[58] Field of Search ............... 365/200, 215, 120, 124, 365/125, 127; 358/128; 179/100.3 P, 100.3 V

[56] References Cited
U.S. PATENT DOCUMENTS

| | | | |
|---|---|---|---|
| 3,365,706 | 1/1968 | King | 365/127 |
| 3,452,331 | 6/1969 | Barlett | 365/127 |
| 3,638,185 | 1/1972 | Dell et al. | 365/200 |
| 3,971,002 | 7/1976 | Bricot et al. | 179/100.3 V |
| 4,038,663 | 7/1977 | Day et al. | 358/128 |
| 4,051,329 | 9/1977 | Blondet et al. | 358/128 |

Primary Examiner—Stuart N. Hecker

[57] ABSTRACT

An error checking method and apparatus for recording digital data in an optical recording medium. Digital data are written onto the medium by a modulated laser whose beam is detected by a first photodetector means which measures laser output directed toward the recording medium. A second photodetector means measures light scattering from the medium, while a third photodetector detects and measures light transmitted through the recording layer of the medium serving to confirm recording of the data. Amounts of transmitted light or scattered light from the medium are correlated to the laser output and to expected values of light for detecting errors in recording immediately after the time of recording. Reversal processing of the recording medium eliminates a large fraction of potential errors.

30 Claims, 6 Drawing Figures

ERROR CHECKING METHOD AND APPARATUS FOR DIGITAL DATA IN OPTICAL RECORDING SYSTEMS

BACKGROUND OF THE INVENTION

1. Field of the Invention

The invention relates to information storage devices and more particularly, to an optical digital data recording and storage system with nearly instantaneous error checking and an enhanced signal-to-noise ratio.

2. Prior Art

Previously, it has been known that digital data could be recorded by optical methods on disks, drums or film. Typically, in the prior art, errors in optical recording systems have been detected by direct comparison of the recorded information with the source of the information, and at other times by statistical methods. This requires time and special equipment. One of the problems which is experienced in attempting to read after writing on a silver halide emulsion coated plate is that there is no known method of immediately reading the latent image to determine whether data has been recorded. These emulsion coated plates, commonly known as photoplates, have required even more time and special equipment for complete error checking.

Some errors in data recording on photoplates are attributable to the optical writing source, frequently a modulated laser, or more often to imperfections in the photoplate emulsion or particulate matter thereon. Errors can be caused by small foreign particles or particles of the medium itself trapped on or in the recording medium which block laser light from recording thereon. Another problem is that the modulator for the light souce, or its associated electronics, may fail momentarily. All of these error sources are of concern in recording information on photoplates or film or the like.

An object of the present invention is to accurately record digital data, with high information density, on photoplates or the like with a means for checking errors arising from imperfections on or in the photoplate, failure of the writing source, or failures in the electronics associated with the source.

SUMMARY OF THE INVENTION

In an optical data recording system, imperfections in the optical recording medium, such as a photoplate, may be detected by correlating light output from a source directed toward the recording medium with light scattered from the recording medium or with light passing through the emulsion of the medium or both. A first photodetector means is positioned for receiving a portion of the light from a modulated laser source with an output beam directed toward the recording medium and generating a first electrical signal indicative of the laser output. A second photodetector means is positioned for receiving a portion of the light scattered from the recording medium and generating a second electrical signal indicative of light intensity. A third photodetector means is positioned for receiving a portion of the light passing through the emulsion and generating a third signal indicative of light intensity. All three electrical signals, or at least two signals if two photodetectors are used, may then be correlated. Presence of the first electrical signal indicates that the light source is writing optical data. Absence of the first electrical signal, or a very low level signal, when it should be present at a calibrated level, indicates lack of a proper light beam output pulse, which is an error which is noted by generating an error signal. Presence of the second electrical signal, above a threshold magnitude, indicates presence of a particle on the surface of the recording medium which is causing a greater amount of scattering than expected, such that the optical signal to be recorded will probably be recorded in error. Absence of the third electrical signal, or a very low level signal when it should be present at a calibrated level, indicates lack of proper recording in the emulsion, which is noted by generating an error signal. At least two, and preferably all three electrical signals are correlated to determine the type of error occurring. Once an error is detected, the same data may be written elsewhere on the recording medium.

To provide even greater accuracy in optical recording, redundant recording may be provided, such as by recording on both sides of a photoplate, or alternatively, recording in two annular bands on the same side of a photoplate.

After writing data on the medium, it is processed for storage and later reading. A large fraction of errors in the recording medium, which may occur in reading data, may be eliminated by reversal processing wherein exposed emulsion is processed so that beam exposed areas are grey or clear, whereas unexposed areas are black. Thus, if a particle is on the photoplate in a region where no exposure occurs, it makes no difference because the area will be black in any event. In regular processing, the particle would appear to be in the unexposed clear portion of the film.

DESCRIPTION OF THE PREFERRED EMBODIMENT

Figure 1:
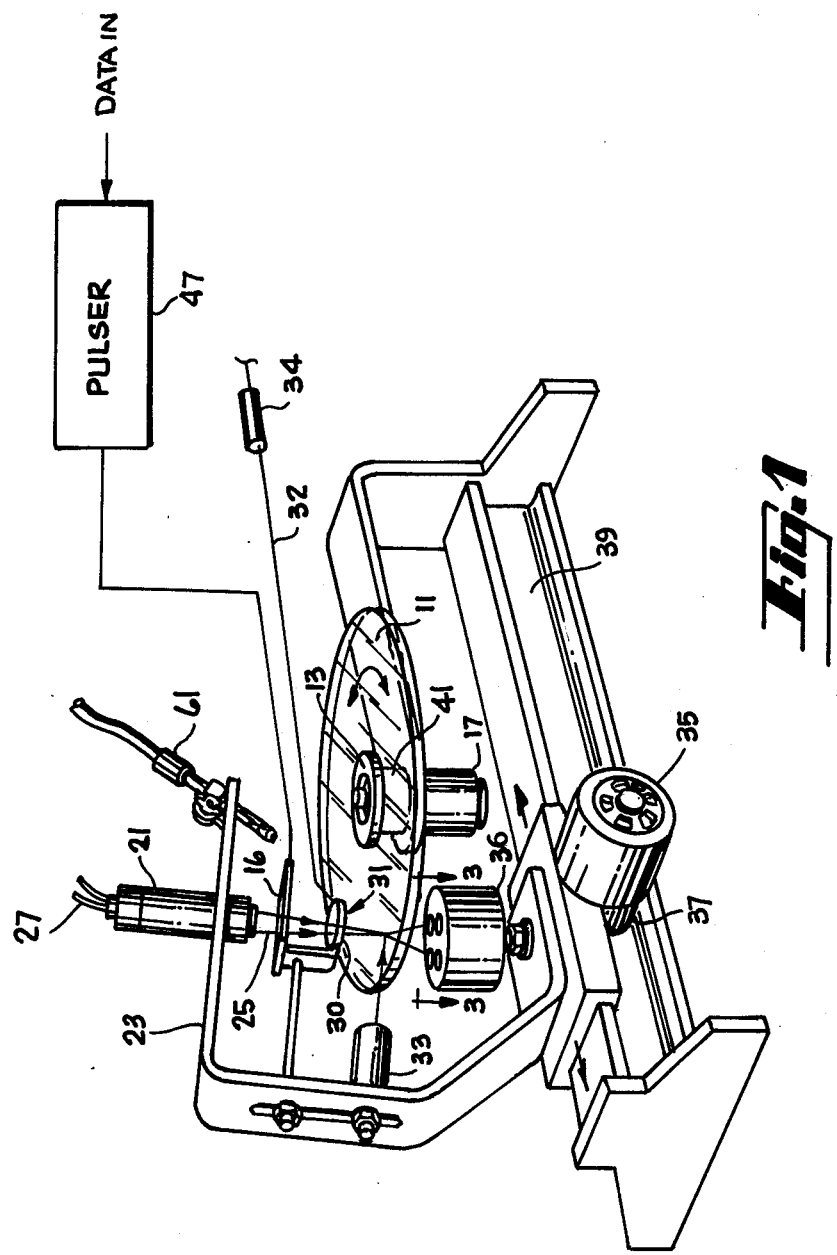
FIG. 1 is a perspective view of the optical components of the data recording system of the present invention.

With reference to FIG. 1, an optical recording medium 11 is shown to be mounted on a hub 13 which forms a support structure for the optical recording medium. Hub 13 has a shaft extending thereunder which is directly driven by air bearing motor 17. The motor shaft is aligned parallel to beam of light 25. Hub 13 is flat and perpendicular to the shaft.

A laser 21 is mounted in the support frame 23 for directing a beam of light 25 perpendicularly downwardly toward the optical recording medium 11. Laser 21 has focusing optics and perhaps external mirrors, not shown, which define an optical axis which may be straight or folded by mirrors for directing light energy in the form of optical pulses toward the recording medium. Laser 21 has a control cable 27 for energizing the laser beam which is modulated by an acousto-optical modulator 16 driven by pulser 47 which converts high frequency electrical binary data to optical binary data by means of modulating beam 25 in a known manner. For example, see U.S. Pat. No. 4,005,275, incorporated by reference herein, for a wideband modulation scheme.

A first photodetector means 31, comprising a beam sampler 30 and a photodetector 34, is positioned to receive at least a portion of beam 25 which is directed toward and incident on the recording medium 11. For example, beam 25 could be sampled by being passed through a beam sampling glass 30 which is connected by means of a fiber optic fiber 32 to first photodetector 34. Glass 30 is of a type having sufficient internal reflection, depending on light beam energy, to provide a signal to fiber 32 on each laser pulse. Alternatively, beam 25 could be sampled by a beam splitter interposed in the beam path for directing a portion of the beam to photodetector 34. It is important to sample beam 25 after it passes through modulator 16 so that the photodetector output will be converted to a first electrical signal indicating that beam 25 is writing. The beam output is compared to data into the modulator, as is commonly now done. Of course, beam 25 could be sampled both before and after passage through modulator 16 in order to detect modulator failures. In the preferred embodiment sampling is done after passage through the modulator because the performance of laser 21 is measured together with the modulator output, typically measuring light intensity and pulse duration. The object of the measurement is not only to determine the existence of a modulated output signal, but to ascertain that the signal level is within a tolerance with reference to expected or desired signal levels. If the signal level drops below the expected level because of power supply or other fluctuations, an error is signaled. The photodetector 34 is a single photodetector optically coupled to fiber 32. The first photodetector means 31 is positioned at a convenient location where the only optical signals into the photodetector 34 are received from fiber 32. Of course, an electrical signal taken directly from the input to pulser 47 could be substituted for the signal sampled by the first photodetector means as an equivalent thereof providing one assumes that the output beam corresponds to the input to pulser 47. In any event, the output of the first photodetector means, or its near equivalent, the output of pulser 47 is compared to data input to make sure that data is indeed being written; if not, an error is signalled.

A second photodetector means 33 is positioned for receiving a portion of beam 25 which is scattered from the optical recording medium 11. Normally, the second photodetector means 33 would be a single photodetector positioned at right angles to the center line of beam 25, i.e. the optical axis. Beam 25 can be orthogonal to medium 11 or make a small acute angle with a line which extends orthogonally from the optical recording medium 11. For example, if the optical axis of laser 21 is positioned such that beam 25 is parallel with the vertical, taken with respect to the optical recording medium 11, the second photodetector means 33 should be positioned at an angle of 275° with respect to the vertical such that the photodetector makes a nearly right angle with beam 25 with the vertex of the angle at a point on the optical recording medium 11 where beam 25 is incident. The purpose of the second photodetector is to detect particles on the recording surface by means of light scattering from the particles. Such scattering may mean that the beam will not penetrate the emulsion to sufficiently expose it compared to beam exposed regions where no particles lie. The second photodetector means produces a second electrical signal indicative of the intensity of light scattered from the beam, typically by means of a proportionality which is predetermined. Light striking the second photodetector without presence of a defect can be used as a reference level.

A third photodetector means 36 is positioned to receive at least a portion of the beam which is transmitted through the emulsion recording medium 11. The recording medium may have a reflective backing in which case light is reflected back in the direction of laser 21, as discussed with reference to FIG. 5, or the medium may be transparent, as shown in FIG. 1. In the latter case, photodetector means 36 is placed in line with the beam on a side of the recording medium opposite to laser 21.

Preferably, photodetector means 36 is an axially symmetric array of four photodetectors clustered for covering the recording area of a cell where a binary signal is to be written. The photodetectors each receive a portion of the beam and generate a third electrical signal. The third signal is a vectorial composite of four signals, one from each photodetector shown in FIG. 3 which allows vector analysis of beam position. In the preferred version, four photodetectors are used to form the third photodetector means and four signals are processed to determine whether the beam is recording in the center of a cell wherein the data is expected to be found upon reading. If the beam is not centered in the cell within present limits, an error signal is generated which can indicate the vectorial deviation, magnitude and direction, of the error track. Such deviation may be caused by laser misalignment with the data recording cell or by diffraction of light from the center to the cell to the periphery thereof. A third electrical signal proportional to the intensity and duration of the pulse received from the beam through the emulsion is generated.

Support frame 23 is provided with a motive means 35, a motor or, alternatively, an air cylinder and piston could be used, for positioning laser 21 at a desired location. The position of laser 21 must be known and a linear motion transducer 37 measures the position of support frame 23 as it is moved along bench 39 either by a motor, as shown, or a cylinder and piston. Similarly, a rotary motion transducer 41, such as a shaft angle encoder, is connected to shaft 15 for accurately measuring the rotary position of the optical recording medium 11. Alternatively, the photoplate may be marked optically with stripes or the like which may be scanned to determine the rotary position of the photoplate. The latter approach has the advantage that the photoplate can then be self-clocked by optical means. If neither the shaft angle is measured, nor the photoplate self-clocked by marking, the position of the photoplate must then be ascertained by other means in order to locate desired storage cells.

Optical recording medium 11 is a disk of photoglass. The side of the photoglass facing the laser has a very thin silver halide emulsion capable of resolving an image of one micron, or better. The photoglass may have either a glass or plastic substrate. It is important that the photoglass be flat, having a disk flatness of one micron per inch or better. Flatness is important to maintain a uniform focal plane for beam 25. Recording is preferably done on the outer half of the disk diameter, with the center half not being used for recording, but may be used for marks which are intended for positioning and self-clocking functions.

Typically, most photoglass has a red or orange antihalation film on the reverse side. Where a blue or green light laser is to be used, as in the present embodiment, it is desirable to avoid such red or orange films if they filter out too much of the incident light, not allowing sufficient beam detection by photodetector means 36. While emulsion-coated photoglass is a preferred optical recording medium, other media could be used which are sensitive to light.

Similarly, all of the photodetectors used in the first, second and third photodetector means must be able to register light energy impinging thereon from the beam source. For a blue or green light laser, photodetectors with sensitivity strongly peaked near the selected laser emission wavelengths are preferable.

Some errors in recording on photoglass are caused by particulate matter on the surface of the photoplate. In the present invention, particles on the surface of the photoplate are detected by an increased amount of light scattering from such particles on the surface at the locations where the beam impinges on the photoplate, compared to the situation where the beam impinges on the photoplate in the absence of such particles.

The laser 21 which is used is a helium-cadmium or argon laser capable of focusing its beam to a 1-micron diameter spot in a nominal 5-square micron recording field which is the approximate size of a data cell. Such a beam would permit the recording of 7200 megabits of data on a 12-inch diameter disk, while recording only on the six outer inches of the disk diameter. This is in comparison to only 360 megabits of digital data which may be recorded on a standard magnetic tape. The laser should have an output energy sufficient to transmit one milliwatt to the emulsion of optical recording medium 11 for exposure thereof. The power at the emulsion surface should be a light exposure level above saturation of the emulsion under the extreme ranges of operation of the laser system, that is, for pulses of the shortest duration and for pulses which may be slightly out of focus due to the slight variations in flatness of the disk. To enhance the depth of field of the laser, the "doughnut mode" output from a helium-cadmium is used, together with an annular objective lens. Data recording rates of more than several megahertz are attained with one milliwatt of power available at the emulsion surface. A laser is not essential, although preferred, for use in the present invention. A beam souce which is compatible with the recording medium and photodetectors should be used.

Laser 21 is focused to a one-micron recording spot in a five-micron recording field or cell so that approximately one-fifth of the recording field or cell area is used. Thus, in the error detection system of the present invention wherein errors appear only at the recording location, only one-fifth of the total recording area need be checked for errors in writing data. This is contradistinction to certain prior art flaw detection systems which scan the entire recording surface prior to recording. In these prior art systems, a flaw detector is used to discover defects in the entire recording medium. One of the advantages of the present invention is that flaw detection is achieved simultaneously with the recording process.

The second photodetector means 33 is a photodetector, such as a photo diode which is particularly sensitive to the wave length of the laser 21. All of the photodetector means 31,33,36 are calibrated to a particular optical recording medium 11. Thus, when the optical recording medium is free from flaws or particulate contamination, the first and third photodetector means should receive a relatively large amount of excitation energy, while the second photodetector means should receive relatively little excitation energy because of low amounts of light scattering from the beam. However, when particulate matter obscures the beam, the first and second photodetector means 31 and 33 will receive a relatively large amount of excitation energy and the third photodetector means 36 a lesser amount. This combination would trigger an error signal. On the other hand, if a hole existed in the optical recording medium, an unusually large amount of excitation would exist in the third photodetector means 36, while the first photodetector means 31 would still show a normal amount of excitation. This also would trigger an error signal.

Preferably signals from all three detectors should be correlated. As a minimum, signals from any two of the three detectors must be correlated for error detection. Correlation takes place in a microcomputer or microprocessor where comparisons are made between expected values derived from calibrations for particular types of recording media and actual measured values. In the event an error signal is generated, as when the actual values exceed expected values beyond set limits, data is re-recorded elsewhere and a data flag is recorded on the recording medium to mark the location of the error.

Figure 2:
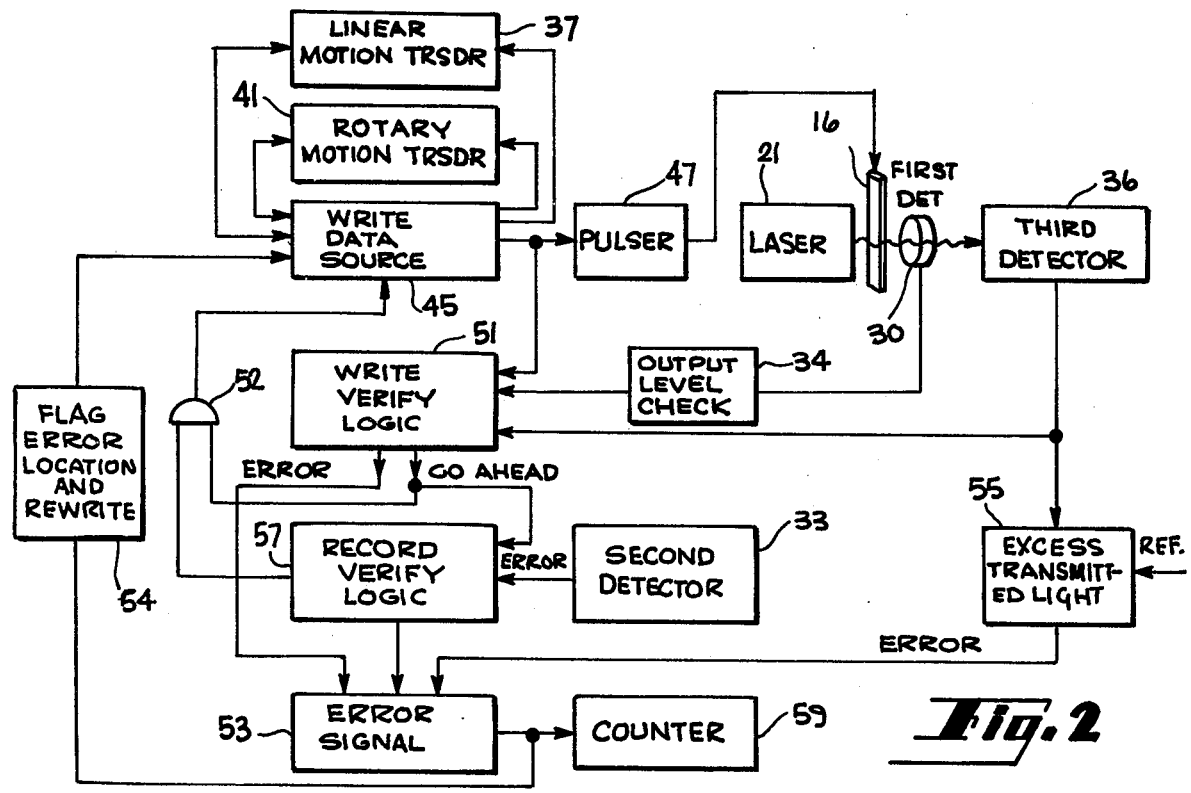
FIG. 2 is a diagram of an electrical plan for the apparatus of FIG. 1.

A simple example of correlation is as follows. Write verify logic 51 in FIG. 2 is a coincidence detector for the first and third photodetector means, i.e. between first detector means 31 and third detector 36. A coincidence signal in write verify logic 51 would signify that light energy from the beam has been emitted from the beam source and passed through the recording medium.

Write verify logic then transmits a signal to record verify logic 57, a gate also having an input from second detector 33. If a larger than expected signal is present from second detector 33, coincident with the signal from write verify logic, a scattering condition is present signifying the probability of a recording error and a coincidence signal is sent to error signal generator 53. However, if a write verify signal arrives at record verify logic and no signal is received from second detector 33 above a preset threshold, then an anticoincidence condition is signalled to AND gate 52. An anticoincidence signal in record verify logic 57 would confirm recording of accurate data from the light beam data source, while a coincident signal would generate an error signal.

The linear motion transducer 37, as well as the rotary motion transducer 41, both convert mechanical motion of the laser and the recording medium into electrical signals which are fed to a computer for precisely controlling and recording the position of the laser with respect to information stored on the optical recording medium 11.

Data souce 45 containing or controlling information to be recorded is typically a computer. The data souce 45 need not be a computer, but in the preferred embodiment the data source is selected to be a computer having data to be written for storage and having a capability for controlling and receiving information from the motion transducers 37, 41, as well as all of the photodetector means. If the data source 45 is not a computer, a separate control computer must be provided to control the motion transducers 37, 41 in order that recording be done in the proper location, to insert error signals in the recording medium when an error or flaw is detected in the recording medium and to carry out certain logic functions described herein. However, the control computer only performs control functions and requires no separate memory for long term storage of information. Once control functions are performed, the optical recording medium is self-sufficient in the same sense that mass storge in magnetic media is self-sufficient.

Data source 45 is connected to a pulser 47 which converts binary digital information received from the data source 45 into electrical pulses which modulate through optical modulator 16 the beam of helium-cadmium or argon laser 21.

Laser 21 responds to the optical modulator 16 to produce a stream of optical pulses corresponding to binary bits from the data souce 45. For example, a laser pulse may represent a digital zero or one, while the absence of a pulse would represent the opposite data bit.

A first photodetector means 31, comprising glass 30, fiber 32 and photodetector 34 generates a signal when light passes therethrough. A signal from the first photodetector means 31 indicates that a laser pulse is present. The output light pulse from laser 21 passes to the third photodetector means 36 which is a detector of transmission of radiation through the emulsion of the optical recording medium. Therefore, the coincidence of a data bit to be written from the data souce 45, a signal that laser 21 has emitted a modulated pulse, as detected by the first photodetector means 31, together with a signal from the third photodetector means 36 confirming transmission of a light pulse through the emulsion of the optical recording medium 11 would all verify that a data bit has been recorded.

Write verify logic 51 is connected to receive signals from the write data source 45, the first photodetector means 31 and the third photodetector means 36 to confirm the writing of the data bit. Upon receipt of the confirming signals within a specified time period a "go ahead" pulse is then transmitted from the write data source 45 to the record verify logic 57. In the event that one or more of the input signals to write verify logic 51 is deficient, write verify logic 51 generates an error signal in the error signal generator 53. An error signal can also be generated by a comparator 55 which has as a reference signal, an input corresponding to an expected amount of incident light from third detector means 36. If an amount of light is incident on optical recording medium 11 greater than the calibrated reference amount, comparator 55 generates an output signal which is transmitted to the error signal generator 53. Such a signal would be generated when there is a hole in the optical recording medium, or when there is an abnormally thin spot. Thus, in the case where the third photodetector means 36 is positioned opposite the laser 21, excess incident energy would be detected in case of a hole or this spot. In this case, the comparator 55 would send a signal to the error signal generator 53.

The second photodetector means 33 detects excess scattering such as from particulate matter on the surface of optical recording medium 11. When the second photodetector means 33 detects an amount of light scattering in excess of a calibrated amount expected for normal recording of data an error signal is transmitted to record verify logic 57. That signal is gated through record verify logic 57 by the "go ahead" signal from write verify logic 51 so that an output signal is fed to error signal generator 53. An error signal is thereupon generated and the data are rewritten. If the second photodetector means 33 detects a proper amount of light scattering for a write data attempt, a "next data bit" signal is generated by second photodetector means 33 which is gated through an "and" gate 52, which may be part of a computer, by the "go ahead" signal from write verify logic 51 when both signals appear as inputs to the gate. This advances write data souce 45 to the next data bit to be written.

When an error signal is generated by error signal generator 53, a pulse is produced which is transmitted to counter 59 and to the write data source 45 through flag gate 54, a pulse shaper, which generates a signal which signifies that the write data source should rewrite the pulse which has just been attempted, in another location, preferably the next location after an error code is inserted which indicates that the previous recording spot should be ignored. Counter 59 counts error signals to determine errors per hundred cells. If the error density exceeds expectations the entire system, electronics and recording medium should be checked for trouble. Most frequently the photoplate will be found defective. In these instances the present apparatus may be considered to be a flaw detector for photoplates.

The linear motion transducer 37 and the rotary motion transducer 41 provide electrical signals to write data source which serve as addresses for data bits being written. These addresses may be supplemented by addresses generated by flag gate 54 to flag addresses of improperly written data.

Error correcting codes may be used to encode data to be written, such that, for example, a single bit error does not change the designation of the character recorded and read. If such a code were used in conjunction with this invention, it would not be necessary to re-record a byte or character if only one bit of a character were found to be in error. However, the present invention does not rely on the use of such code for the detection and location of error signals caused by defects in the recording medium or its electronics. Thus the apparatus of this invention not only corrects errors, but it locates them, counts them and determines the overall quality of the media with regard to defects.

In reading data, an unmodulated or modulated laser or an equivalent light souce is directed onto the recording medium with its beam directed to the center of each data cell. The beam is interrupted by transparent images against a dark field representing data bits and these interruptions are detected by a photodetector behind the emulsion of the recording medium. This photodetector then produces electrical signals corresponding to recorded data for transmission and use in data processing machinery.

The recorded data are made transparent against a dark field by means of reversal processing of the recording media. As mentioned previously, this processing has the advantage that particulate matter outside of the spot where data is recorded will be dark and will not create an ambiguity between such matter and data, which is light or grey. Since each cell where data is written has a nominal area of five square microns and since the spot represented by a data bit occupies one square micron in the center of the cell, reversal processing essentially occuludes the four-fifths of the cell where no data exists thereby limiting the effect of particulate matter, if any, to the one-fifth area where data exists. This type of processing dramatically increases the signal-to-noise ratio of photoplates and films, as data recording media. Previously the signal-to-noise ratio of photoplates was thought to compare unfavorably with magnetic recording media. With reversal processing, photoplates can be shown to be as good as magnetic media with respect to signal-to-noise ratio.

Figure 3:
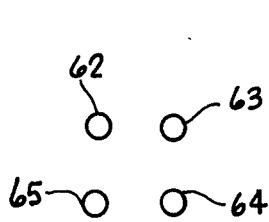
FIG. 3 is a geometric representation of the photodetector configuration, taken along the lines 3—3 in FIG. 1.

FIG. 3 shows an array of photodetectors which form the third photodetector means 36 in FIG. 1. As previously mentioned the third photodetector means 36 comprises an array of photodetectors 62, 63, 64 and 65 which survey the area of the recording cell. The photodetectors 62, 63, 64, 65 have outputs which are combined to give a vectorial indication, i.e. magnitude and direction, of any laser misalignment or beam diffraction by particulate matter partially obscuring the site where data would be written in the absence of such particulate matter. The array of FIG. 3 is square for convenience of surveying a square data cell. However, the array may be any axially symmetric shape about the optical axis of the beam which is convenient for the cell geometry.

Figure 4:
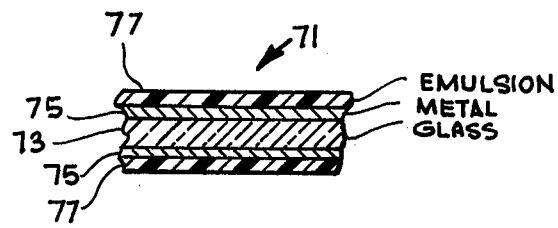
FIG. 4 is a partial sectional view of a photoplate suitable for recording on both sides.

FIG. 4 illustrates an optical recording medium 71 which has a glass core or substrate 73, a reflective metallized layer 75 on both sides of the central glass core, thereby forming a sandwich, with silver halide emulsion 77 covering the metal layer 75, also on both sides of the core. The advantage of such a structure is that light incident on the optical recording medium 71 will expose the emulsion 77 and be reflected from the metallized layer 75. In this instance, the third photodetector means 36 would be positioned on the same side of the optical recording medium 11 as laser 21 to detect reflected light from the optical recording medium 71. Reflected light will return through the objective lens to photodetector means 36 by means of a beam splitter. Such a reflective digital data storage medium would have high signal-to-noise ratio and archival storage properties because the emulsion prevents flaking of the metal layer.

Figure 5:
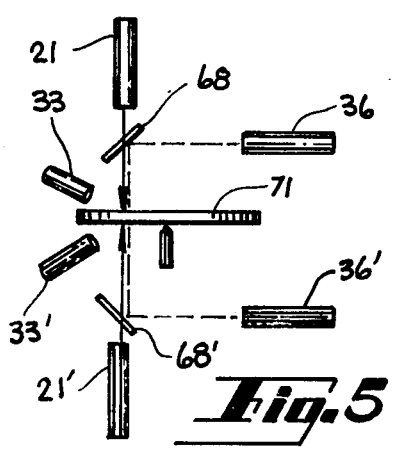
FIG. 5 is a side plan view for an optical data recording system of the present invention with a redundancy feature.

FIG. 5 illustrates one way in which the optical recording medium 71 of FIG. 4 may be utilized. In FIG. 5 redundancy in data recording may be provided by recording identical data on both sides of the optical recording medium 71. Redundant systems include the lasers 21,21'. The third photodetector means 36,36' are positioned at right angles to the respective beams facing the respective beam splitters 68,68' in positions to detect light reflected from the surface of optical recording medium 71. The second photodetector means 33,33' are positioned on opposite lateral sides of the optical recording medium 71 in positions to detect scattered light from the surface of optical recording medium 71 as previously described.

A prior art method of laser writing on a reflective disk is described in the article, "A Review of the MCA Disco-Vision Systm" by K. Broadbent, Journal of the SMPTE, 83, 554, July 1974, incorporated by reference herein.

Figure 6:
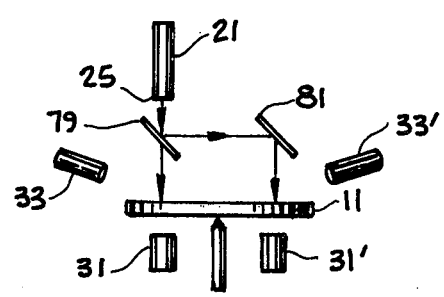
FIG. 6 is a side plan view for an alternate embodiment of an optical data recording system of the present invention with another redundancy feature.

Another redundant system is illustrated in FIG. 6. In FIG. 6 laser 21 has a beam 25 which is split into two components by beam splitter 79. One beam component is directed into a first annular band in the optical recording medium 11. Third photodetector means 36 and second photodetector means 33 are positioned as described with reference to FIG. 1. However, a second component of the beam deflected from beam splitter 79 impinges on mirror 81 and is reflected onto the optical recording medium 11 in a second annular recording band which is different from the first annular band. A third photodetector means 36' intercepts light transmitted through the optical recording medium while a second photodetector means, 33', detects scattered light. A reason for providing redundancy is to increase the reliability of error detection. If an error is detected in either recording band, the recording site is rejected. The electrical plan for each redundant system is substantially the same as described with respect to FIG. 2, except that correlation between redundant systems is provided.

To further reduce errors due to particulate contamination of the optical recording medium surface, an air jet may be directed onto the recording medium surface immediately preceding the beam. Preferably, a jet of dry, ionized air or nitrogen from a nozzle 61 in FIG. 1 is preferable for removing particles from the immediate area being recorded upon. An advantage of the present invention is that if the same technique were used in a pre-recording flaw detection system, the results would not be of great value since surface particles would be in different spots upon subsequent recording. However, in the present error detection method and apparatus the simultaneity of data recording and error detection allows for immediate correction of errors due to particulate matter. Upon playback, the air jet helps reduce the probability that new errors have been introduced since recording.

The method and apparatus of the present invention relies on scattering and reduced or increased transmission through an optical recording medium for error detection. This allows use of the simplest recording patterns, e.g. a one is a clear spot and a zero is a black area. However, if more sophisticated recording patterns are used, the present apparatus may be still used, to detect very tiny particles since the recording pattern would detect larger ones. For example, if the pattern consisted of one clear spot for binary "zero" and two clear spots for binary "one", with each spot being one micron in size, any defect a few microns in diameter would wipe out either a single spot or a double spot and an error would be noted since there would be a complete absence of spots. However, for defects on the order of one micron or less, detection of defects would require use of the scattering detector, as well as the transmission detector.

What is claimed is:

1. An error detecting system for an optical data recording apparatus comprising,
   an optical recording medium having a recording layer which is light transmissive prior to recording data on at least one side thereof,
   light beam means positioned for writing optical pulses on said recording medium in selected locations,
   a pair of photodetector means positioned for receiving optical energy scattered from said recording medium and optical energy passing through the recording layer of the recording medium, said pair of photodetctor means generating first and second electrical signals indicative of the energy received from said pulses, and
   correlating means connected to receive said first and second electrical signals for signalling data errors in writing on said recording medium.

2. The system of claim 1 wherein one of said photodetector means is disposed in the path of said optical pulses on a side of said optical recording medium opposite of said light beam means for confirming writing on said optical recording medium.

3. The apparatus of claim 1 wherein said light beam means is a laser of a selected wavelength.

4. The apparatus of claim 3 wherein said pair of photodetector means comprises photodetectors having sensitivity strongly peaked in the selected wavelength of said laser.

5. The apparatus of claim 1 wherein a coincidence detection means is connected on the one hand to an input modulation signal causing said optical pulses in said light beam means and on the other hand to one of said photodetector means, for detecting transmission of optical pulses toward said optical recording medium.

6. The apparatus of claim 1 wherein a coincidence detection means is connected to said pair of photodetector means for detecting anticoincident activation by said light beam when one of said photodetector means detects light scattering from said recording medium.

7. The apparatus of claim 1 wherein said optical recording medium is a glass, circular photoplate disk coated with photo sensitive material.

8. The apparatus of claim 1 wherein said optical recording medium is a plastic, circular photoplate disk coated with photo sensitive material.

9. The apparatus of claim 1 wherein said light beam means comprises optical means for simultaneously writing the same optical pulses on two spaced apart locations on the same side of sid photoplate.

10. An optical data recording system comprising,
an optical recording medium having a light transmissive recording layer on at least one side thereof,
light beam means positioned for writing optical pulses on said recording medium in selected locations,
first photodetector means positioned for receiving a portion of the energy from said optical pulses directed toward said recording medium and generating a first electrical signal indicative of the energy intensity received from said pulses,
second photodetector means positioned for receiving a portion of the energy from said optical pulses, said energy scattered from said recording medium and generating a second electrical signal indicative of the energy intensity received from said pulses,
third photodetector means positioned for receiving a portion of the energy from said optical pulses which passes through the recording layer of said recording medium, and generating a third electrical signal indicative of the energy intensity received from said pulses, and
correlating means connected to receive said first, second, and third electrical signals for signalling data errors in writing on said recording surface.

11. An error detecting system for an optical data recording apparatus comprising,
an optical recording medium having a recording layer which is light transmissive prior to recording data on at least one side thereof,
light beam means positioned for writing optical pulses on said recording medium in selected locations,
a pair of photodetector means positioned for receiving optical energy directed toward said recording medium and optical energy scattered from said recording medium, said pair of photodetector means generating first and second electrical signals indicative of the energy received from said pulses, and
correlating means connected to receive said first and second electrical signals for signalling data errors in writing on said recording medium.

12. The system of claim 11 wherein one of said photodetector means is disposed in the path of optical pulses on the same side of said optical recording medium as said light beam means.

13. The apparatus of claim 11 wherein a coincidence detection means is connected on the one hand to an input modulation signal causing said optical pulses in said light beam means and on the other hand to one of said photodetector means, for detecting transmission of optical pulses toward said optical recording medium.

14. The apparatus of claim 11 wherein a coincidence detection means is connected to said pair of photodetector means for detecting anticoincident activation by said light beam when one of said photodetector means detects light scattering from said recording medium.

15. The apparatus of claim 11 wherein said light beam means is a laser and said pair of photodetector means comprises photodetectors having sensitivity strongly peaked in the selected wavelength of said laser.

16. An error detecting system for an optical data recording apparatus comprising,
an optical recording medium having a recording layer which is light transmissive prior to recording data on at least one side thereof,
light beam means positioned for writing optical pulses on said recording medium in selected locations,
a pair of photodetector means positioned for receiving optical energy directed toward said recording medium and for receiving optical energy passing through the recording layer of the recording medium, said pair of photodetector means generating first and second electrical signals indicative of the energy received from saidd pulses, and
correlating means connected to receive said first and second electrical signals for signalling data errors in writing on said recording medium.

17. The system of claim 16 wherein one of said photodetector means is disposed in the path of optical pulses on the same side of said optical recording medium as said light beam means.

18. The system of claim 16 wherein a coincidence detection means is connected on the one hand to an input modulation signal causing said optical pulses in said light beam means and on the other hand to one of said photodetector means, for detecting transmission of optical pulses toward said optical recording medium.

19. The system of claim 16 wherein said light beam means is a laser.

20. A method of recording and error checking optical pulses on an optical recording medium comprising,
directing optical pulses from a light souce at an optical recording medium which is light transmissive prior to recording data,
detecting optical energy scattered from said recording medium, detecting optical energy passing through the recording layer of the recording medium, and generating corresponding first and second electrical signals indicative of the energy received from said pulses, and
correlating said first and second electrical signals for signalling data errors in writing on said recording medium.

21. The method of claim 20 further defined by reversal processing of said optical recording medium, said optical recording medium comprising a substrate and a photo sensitive emulsion.

22. The method of claim 20 further defined by encoding data in said optical pulses by means of an error correcting code.

23. The method of claim 20 further defined by using data recording patterns for error detection.

24. A method of recording and error checking optical pulses on an optical recording medium comprising,
   directing optical pulses from a light souce at an optical recording medium which is light transmissive prior to recording data,
   detecting optical energy directed toward said recording medium and detecting optical energy scattered from said recording medium,
   generating corresponding first and second electrical signals indicative of the energy received from said pulses, and
   correlating said first and second electrical signals for signalling data errors in writing on said recording medium.

25. The method of claim 24 further defined by reversal processing of said optical recording medium, said optical recording medium comprising a substrate and a photo sensitive emulsion.

26. The method of claim 24 further defined by encoding data in said optical pulses by means of an error correcting code.

27. The method of claim 24 further defined by using data recording patterns for error detection.

28. A method of recording and error checking optical pulses on an optical recording medium comprising,
   directing optical pulses from a light source at an optical recording medium which is light transmissive prior to recording data,
   detecting optical energy directed toward said recording medium and detecting optical energy transmitted through said recording medium,
   generating corresponding first and second electrical signals indicative of the energy received from said pulses, and
   correlating said first and second electrical signals for signalling data errors in writing on said recording medium.

29. The method of claim 28 further defined by encoding data in said optical pulses by means of an error correcting code.

30. The method of claim 28 further defined by using data recording patterns for error detection.

* * * * *